(12) United States Patent
Rosenberg (10) Patent No.: US 10,592,867 B2
(45) Date of Patent: Mar. 17, 2020

(54) IN-MEETING GRAPHICAL USER INTERFACE DISPLAY USING CALENDAR INFORMATION AND SYSTEM

(71) Applicant: Cisco Technology, Inc., San Jose, CA (US)

(72) Inventor: Jonathan Rosenberg, Freehold, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 169 days.

(21) Appl. No.: 15/349,818

(22) Filed: Nov. 11, 2016

(65) Prior Publication Data

US 2018/0139246 A1 May 17, 2018

(51) Int. Cl.
*G06F 13/00* (2006.01)
*G06Q 10/10* (2012.01)
(Continued)

(52) U.S. Cl.
CPC ....... *G06Q 10/1095* (2013.01); *H04L 51/046* (2013.01); *H04L 65/403* (2013.01)

(58) Field of Classification Search
CPC .. G06Q 10/107; G06Q 10/10; G06Q 10/1095; H04L 12/585; H04L 12/58;
(Continued)

(56) References Cited

U.S. PATENT DOCUMENTS

| 4,460,807 A | 7/1984 | Kerr et al. |
| 4,890,257 A | 12/1989 | Anthias et al. |

(Continued)

FOREIGN PATENT DOCUMENTS

| CN | 101055561 | 10/2007 |
| CN | 101076060 | 11/2007 |

(Continued)

OTHER PUBLICATIONS

Author Unknown, "A Primer on the H.323 Series Standard," Version 2.0, available at http://www.packetizer.com/voip/h323/papers/primer/, retrieved on Dec. 20, 2006, 17 pages.

(Continued)

*Primary Examiner* — Robert B Harrell
(74) *Attorney, Agent, or Firm* — Polsinelli PC (57) ABSTRACT

A meeting application can gather calendar information from a calendaring service, even if that calendaring service is independent from (e.g., a "third party to") the meeting service. The meeting application can incorporate the calendar information into an in-meeting graphical user interface so that the calendar information can be displayed with the meeting. In some embodiments, this includes listing all invitees and participants alongside their associated acceptance status (e.g., are they present, did they accept, did they decline, etc.). In some embodiments, the calendar information can inform a meeting timer that can indicate the remaining time for the meeting. In some embodiments, the calendar information can inform individual timers that indicate how much time individual participants have before their next appointment.

26 Claims, 7 Drawing Sheets

(51) Int. Cl.
*H04L 12/58* (2006.01)
*H04L 29/06* (2006.01)

(58) Field of Classification Search
CPC .............. H04L 12/581; H04L 12/5855; H04L 12/1827; H04L 29/06027; H04L 29/06; H04L 51/046; H04L 65/403; H04L 65/1066; H04M 11/066; H04M 3/20; H04M 3/42; H04M 3/56; H04M 3/565; H04M 3/567; H04M 3/568; H04M 7/006; H04M 9/002; H04M 9/005; H04M 2203/5054; H04M 2203/5063; H04M 2203/5081; H04N 7/141; H04N 1/00352; H04N 7/15; H04N 7/147; H04N 7/142; H04N 7/148; H04N 7/152; H04N 7/157; G06F 3/048171; G06F 13/00; H04Q 3/625

USPC ............ 348/14.03, 14.08; 709/206; 379/158, 379/202.01

See application file for complete search history.

(56) References Cited

U.S. PATENT DOCUMENTS

| | | |
|---|---|---|
| 4,977,605 A | 12/1990 | Fardeau et al. |
| 5,293,430 A | 3/1994 | Shiau et al. |
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,889,671 A | 3/1999 | Autermann et al. |
| 5,917,537 A | 6/1999 | Lightfoot et al. |
| 5,995,096 A | 11/1999 | Kitahara et al. |
| 6,023,606 A | 2/2000 | Monte et al. |
| 6,040,817 A | 3/2000 | Sumikawa |
| 6,075,531 A | 6/2000 | DeStefano |
| 6,085,166 A | 7/2000 | Beckhardt et al. |
| 6,191,807 B1 | 2/2001 | Hamada et al. |
| 6,300,951 B1 | 10/2001 | Filetto et al. |
| 6,392,674 B1 | 5/2002 | Hiraki et al. |
| 6,424,370 B1 | 7/2002 | Courtney |
| 6,463,473 B1 | 10/2002 | Gubbi |
| 6,553,363 B1 | 4/2003 | Hoffman |
| 6,554,433 B1 | 4/2003 | Holler |
| 6,573,913 B1 | 6/2003 | Butler et al. |
| 6,646,997 B1 | 11/2003 | Baxley et al. |
| 6,665,396 B1 | 12/2003 | Khouri et al. |
| 6,700,979 B1 | 3/2004 | Washiya |
| 6,711,419 B1 | 3/2004 | Mori |
| 6,754,321 B1 | 6/2004 | Innes et al. |
| 6,754,335 B1 | 6/2004 | Shaffer et al. |
| RE38,609 E | 10/2004 | Chen et al. |
| 6,816,464 B1 | 11/2004 | Scott et al. |
| 6,865,264 B2 | 3/2005 | Berstis |
| 6,938,208 B2 | 8/2005 | Reichardt |
| 6,978,499 B2 | 12/2005 | Gallant et al. |
| 7,046,134 B2 | 5/2006 | Hansen |
| 7,046,794 B2 | 5/2006 | Piket et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,209,475 B1 | 4/2007 | Shaffer et al. |
| 7,340,151 B2 | 3/2008 | Taylor et al. |
| 7,366,310 B2 | 4/2008 | Stinson et al. |
| 7,418,664 B2 | 8/2008 | Ben-Shachar et al. |
| 7,441,198 B2 | 10/2008 | Dempski et al. |
| 7,478,339 B2 | 1/2009 | Pettiross et al. |
| 7,500,200 B2 | 3/2009 | Kelso et al. |
| 7,530,022 B2 | 5/2009 | Ben-Shachar et al. |
| 7,552,177 B2 | 6/2009 | Kessen et al. |
| 7,577,711 B2 | 8/2009 | McArdle |
| 7,584,258 B2 | 9/2009 | Maresh |
| 7,587,028 B1 | 9/2009 | Broerman et al. |
| 7,606,714 B2 | 10/2009 | Williams et al. |
| 7,606,862 B2 | 10/2009 | Swearingen et al. |
| 7,620,902 B2 | 11/2009 | Manion et al. |
| 7,634,533 B2 | 12/2009 | Rudolph et al. |
| 7,774,407 B2 | 8/2010 | Daly et al. |
| 7,792,277 B2 | 9/2010 | Shaffer et al. |
| 7,830,814 B1 | 11/2010 | Allen et al. |
| 7,840,013 B2 | 11/2010 | Dedieu et al. |
| 7,840,980 B2 | 11/2010 | Gutta |
| 7,881,450 B1 | 2/2011 | Gentle et al. |
| 7,920,160 B2 | 4/2011 | Tamaru et al. |
| 7,956,869 B1 | 6/2011 | Gilra |
| 7,986,372 B2 | 7/2011 | Ma et al. |
| 7,995,464 B1 | 8/2011 | Croak et al. |
| 8,059,557 B1 | 11/2011 | Sigg et al. |
| 8,081,205 B2 | 12/2011 | Baird et al. |
| 8,140,973 B2 | 3/2012 | Sandquist et al. |
| 8,169,463 B2 | 5/2012 | Enstad et al. |
| 8,219,624 B2 | 7/2012 | Haynes et al. |
| 8,274,893 B2 | 9/2012 | Bansal et al. |
| 8,290,998 B2 | 10/2012 | Stienhans et al. |
| 8,301,883 B2 | 10/2012 | Sundaram et al. |
| 8,340,268 B2 | 12/2012 | Knaz |
| 8,358,327 B2 | 1/2013 | Duddy |
| 8,423,615 B1 | 4/2013 | Hayes |
| 8,428,234 B2 | 4/2013 | Knaz |
| 8,433,061 B2 | 4/2013 | Cutler |
| 8,434,019 B2 | 4/2013 | Nelson |
| 8,437,461 B1 * | 5/2013 | Gartner ................. H04M 3/565 379/158 |
| 8,456,507 B1 | 6/2013 | Mallappa et al. |
| 8,462,103 B1 | 6/2013 | Moscovitch et al. |
| 8,478,848 B2 | 7/2013 | Minert |
| 8,520,370 B2 | 8/2013 | Waitzman, III et al. |
| 8,625,749 B2 | 1/2014 | Jain et al. |
| 8,630,208 B1 | 1/2014 | Kjeldaas |
| 8,638,354 B2 | 1/2014 | Leow et al. |
| 8,645,464 B2 | 2/2014 | Zimmet et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,732,149 B2 | 5/2014 | Lida et al. |
| 8,738,080 B2 | 5/2014 | Nhiayi et al. |
| 8,751,572 B1 | 6/2014 | Behforooz et al. |
| 8,831,505 B1 | 9/2014 | Seshadri |
| 8,850,203 B2 | 9/2014 | Sundaram et al. |
| 8,860,774 B1 | 10/2014 | Sheeley et al. |
| 8,874,644 B2 | 10/2014 | Allen et al. |
| 8,890,924 B2 | 11/2014 | Wu |
| 8,892,646 B2 | 11/2014 | Chaturvedi et al. |
| 8,914,444 B2 | 12/2014 | Hladik, Jr. |
| 8,914,472 B1 | 12/2014 | Lee et al. |
| 8,924,862 B1 | 12/2014 | Luo |
| 8,930,840 B1 | 1/2015 | Riskó et al. |
| 8,947,493 B2 | 2/2015 | Lian et al. |
| 8,972,494 B2 | 3/2015 | Chen et al. |
| 9,003,445 B1 | 4/2015 | Rowe |
| 9,031,839 B2 | 5/2015 | Thorsen et al. |
| 9,032,028 B2 | 5/2015 | Davidson et al. |
| 9,075,572 B2 | 7/2015 | Ayoub et al. |
| 9,118,612 B2 | 8/2015 | Fish et al. |
| 9,131,017 B2 | 9/2015 | Kurupacheril et al. |
| 9,137,376 B1 | 9/2015 | Basart et al. |
| 9,143,729 B2 | 9/2015 | Anand et al. |
| 9,165,281 B2 | 10/2015 | Orsolini et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,204,099 B2 | 12/2015 | Brown |
| 9,219,735 B2 | 12/2015 | Hoard et al. |
| 9,246,855 B2 | 1/2016 | Maehiro |
| 9,258,033 B2 | 2/2016 | Showering |

(56) References Cited

U.S. PATENT DOCUMENTS

| | | |
|---|---|---|
| 9,268,398 B2 | 2/2016 | Tipirneni |
| 9,298,342 B2 | 3/2016 | Zhang et al. |
| 9,323,417 B2 | 4/2016 | Sun et al. |
| 9,335,892 B2 | 5/2016 | Ubillos |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,407,621 B2 | 8/2016 | Vakil et al. |
| 9,432,512 B2 | 8/2016 | You |
| 9,449,303 B2 | 9/2016 | Underhill et al. |
| 9,495,664 B2 | 11/2016 | Cole et al. |
| 9,513,861 B2 | 12/2016 | Lin et al. |
| 9,516,022 B2 | 12/2016 | Borzycki et al. |
| 9,525,711 B2 | 12/2016 | Ackerman et al. |
| 9,553,799 B2 | 1/2017 | Tarricone et al. |
| 9,563,480 B2 | 2/2017 | Messerli et al. |
| 9,609,030 B2 | 3/2017 | Sun et al. |
| 9,609,514 B2 | 3/2017 | Mistry et al. |
| 9,614,756 B2 | 4/2017 | Joshi |
| 9,640,194 B1 | 5/2017 | Nemala et al. |
| 9,667,799 B2 | 5/2017 | Olivier et al. |
| 9,674,625 B2 | 6/2017 | Armstrong-Mutner |
| 9,762,709 B1 | 9/2017 | Snyder et al. |
| 2001/0030661 A1 | 10/2001 | Reichardt |
| 2002/0018051 A1 | 2/2002 | Singh |
| 2002/0076003 A1 | 6/2002 | Zellner et al. |
| 2002/0078153 A1 | 6/2002 | Chung et al. |
| 2002/0140736 A1 | 10/2002 | Chen |
| 2002/0188522 A1 | 12/2002 | McCall et al. |
| 2003/0028647 A1 | 2/2003 | Grosu |
| 2003/0046421 A1 | 3/2003 | Horvitz et al. |
| 2003/0068087 A1 | 4/2003 | Wu et al. |
| 2003/0154250 A1 | 8/2003 | Miyashita |
| 2003/0174826 A1 | 9/2003 | Hesse |
| 2003/0187800 A1 | 10/2003 | Moore et al. |
| 2003/0197739 A1 | 10/2003 | Bauer |
| 2003/0227423 A1 | 12/2003 | Arai et al. |
| 2004/0039909 A1 | 2/2004 | Cheng |
| 2004/0054885 A1 | 3/2004 | Bartram et al. |
| 2004/0098456 A1 | 5/2004 | Krzyzanowski et al. |
| 2004/0210637 A1 | 10/2004 | Loveland |
| 2004/0253991 A1 | 12/2004 | Azuma |
| 2004/0267938 A1 | 12/2004 | Shoroff et al. |
| 2005/0014490 A1 | 1/2005 | Desai et al. |
| 2005/0031136 A1 | 2/2005 | Du et al. |
| 2005/0048916 A1 | 3/2005 | Suh |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0131774 A1 | 6/2005 | Huxter |
| 2005/0175208 A1 | 8/2005 | Shaw et al. |
| 2005/0215229 A1 | 9/2005 | Cheng |
| 2005/0226511 A1 | 10/2005 | Short |
| 2005/0231588 A1 | 10/2005 | Yang et al. |
| 2005/0286711 A1 | 12/2005 | Lee et al. |
| 2006/0004911 A1 | 1/2006 | Becker et al. |
| 2006/0020697 A1 | 1/2006 | Kelso et al. |
| 2006/0026255 A1 | 2/2006 | Malamud et al. |
| 2006/0083305 A1 | 4/2006 | Dougherty et al. |
| 2006/0084471 A1 | 4/2006 | Walter |
| 2006/0164552 A1 | 7/2006 | Cutler |
| 2006/0224430 A1 | 10/2006 | Butt |
| 2006/0250987 A1 | 11/2006 | White et al. |
| 2006/0271624 A1 | 11/2006 | Lyle et al. |
| 2007/0005752 A1 | 1/2007 | Chawla et al. |
| 2007/0021973 A1 | 1/2007 | Stremler |
| 2007/0025576 A1 | 2/2007 | Wen |
| 2007/0041366 A1 | 2/2007 | Vugenfirer et al. |
| 2007/0047707 A1 | 3/2007 | Mayer et al. |
| 2007/0058842 A1 | 3/2007 | Vallone et al. |
| 2007/0067387 A1 | 3/2007 | Jain et al. |
| 2007/0091831 A1 | 4/2007 | Croy et al. |
| 2007/0100986 A1 | 5/2007 | Bagley et al. |
| 2007/0106747 A1 | 5/2007 | Singh et al. |
| 2007/0116225 A1 | 5/2007 | Zhao et al. |
| 2007/0139626 A1 | 6/2007 | Saleh et al. |
| 2007/0150453 A1 | 6/2007 | Morita |
| 2007/0168444 A1 | 7/2007 | Chen et al. |
| 2007/0198637 A1 | 8/2007 | Deboy et al. |
| 2007/0208590 A1 | 9/2007 | Dorricott et al. |
| 2007/0248244 A1 | 10/2007 | Sato et al. |
| 2007/0250567 A1 | 10/2007 | Graham et al. |
| 2008/0059986 A1 | 3/2008 | Kalinowski et al. |
| 2008/0068447 A1 | 3/2008 | Mattila et al. |
| 2008/0071868 A1 | 3/2008 | Arenburg et al. |
| 2008/0080532 A1 | 4/2008 | O'Sullivan et al. |
| 2008/0107255 A1 | 5/2008 | Geva et al. |
| 2008/0133663 A1 | 6/2008 | Lentz |
| 2008/0154863 A1 | 6/2008 | Goldstein |
| 2008/0209452 A1 | 8/2008 | Ebert et al. |
| 2008/0270211 A1 | 10/2008 | Vander Veen et al. |
| 2008/0278894 A1 | 11/2008 | Chen et al. |
| 2009/0012963 A1 | 1/2009 | Johnson et al. |
| 2009/0019374 A1 | 1/2009 | Logan et al. |
| 2009/0049151 A1 | 2/2009 | Pagan |
| 2009/0064245 A1 | 3/2009 | Facemire et al. |
| 2009/0075633 A1 | 3/2009 | Lee et al. |
| 2009/0089822 A1 | 4/2009 | Wada |
| 2009/0094088 A1 | 4/2009 | Chen et al. |
| 2009/0100142 A1 | 4/2009 | Stern et al. |
| 2009/0119373 A1 | 5/2009 | Denner et al. |
| 2009/0132949 A1 | 5/2009 | Bosarge |
| 2009/0193327 A1 | 7/2009 | Roychoudhuri et al. |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0278851 A1 | 11/2009 | Ach et al. |
| 2009/0282104 A1 | 11/2009 | O'Sullivan et al. |
| 2009/0292999 A1 | 11/2009 | LaBine et al. |
| 2009/0296908 A1 | 12/2009 | Lee et al. |
| 2009/0306981 A1 | 12/2009 | Cromack et al. |
| 2009/0309846 A1 | 12/2009 | Trachtenberg et al. |
| 2009/0313334 A1 | 12/2009 | Seacat et al. |
| 2010/0005142 A1 | 1/2010 | Xiao et al. |
| 2010/0005402 A1 | 1/2010 | George et al. |
| 2010/0031192 A1 | 2/2010 | Kong |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0077109 A1 | 3/2010 | Yan et al. |
| 2010/0094867 A1 | 4/2010 | Badros et al. |
| 2010/0095327 A1 | 4/2010 | Fujinaka et al. |
| 2010/0121959 A1 | 5/2010 | Lin et al. |
| 2010/0131856 A1 | 5/2010 | Kalbfleisch et al. |
| 2010/0157978 A1 | 6/2010 | Robbins et al. |
| 2010/0162170 A1 | 6/2010 | Johns et al. |
| 2010/0183179 A1 | 7/2010 | Griffin, Jr. et al. |
| 2010/0211872 A1 | 8/2010 | Rolston et al. |
| 2010/0215334 A1 | 8/2010 | Miyagi |
| 2010/0220615 A1 | 9/2010 | Enstrom et al. |
| 2010/0241691 A1 | 9/2010 | Savitzky et al. |
| 2010/0245535 A1 | 9/2010 | Mauchly |
| 2010/0250817 A1 | 9/2010 | Collopy et al. |
| 2010/0262266 A1 | 10/2010 | Chang et al. |
| 2010/0262925 A1 | 10/2010 | Liu et al. |
| 2010/0275164 A1 | 10/2010 | Morikawa |
| 2010/0302033 A1 | 12/2010 | Devenyi et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0072037 A1 | 3/2011 | Lotzer |
| 2011/0075830 A1 | 3/2011 | Dreher et al. |
| 2011/0087745 A1 | 4/2011 | O'Sullivan et al. |
| 2011/0117535 A1 | 5/2011 | Benko et al. |
| 2011/0131498 A1 | 6/2011 | Chao et al. |
| 2011/0154427 A1 | 6/2011 | Wei |
| 2011/0230209 A1 | 9/2011 | Kilian |
| 2011/0264928 A1 | 10/2011 | Hinckley |
| 2011/0270609 A1 | 11/2011 | Jones et al. |
| 2011/0271211 A1 | 11/2011 | Jones et al. |
| 2011/0283226 A1 | 11/2011 | Basson et al. |
| 2011/0314139 A1 | 12/2011 | Song et al. |

(56) References Cited

U.S. PATENT DOCUMENTS

| | | |
|---|---|---|
| 2012/0009890 A1 | 1/2012 | Curcio et al. |
| 2012/0013704 A1 | 1/2012 | Sawayanagi et al. |
| 2012/0013768 A1 | 1/2012 | Zurek et al. |
| 2012/0026279 A1 | 2/2012 | Kato |
| 2012/0054288 A1 | 3/2012 | Wiese et al. |
| 2012/0072364 A1 | 3/2012 | Ho |
| 2012/0084714 A1 | 4/2012 | Sirpal et al. |
| 2012/0092436 A1 | 4/2012 | Pahud et al. |
| 2012/0140970 A1 | 6/2012 | Kim et al. |
| 2012/0179502 A1 | 7/2012 | Farooq et al. |
| 2012/0190386 A1 | 7/2012 | Anderson |
| 2012/0192075 A1 | 7/2012 | Ebtekar et al. |
| 2012/0233020 A1 | 9/2012 | Eberstadt et al. |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0303476 A1 | 11/2012 | Krzyzanowski et al. |
| 2012/0306757 A1 | 12/2012 | Keist et al. |
| 2012/0306993 A1 | 12/2012 | Sellers-Blais |
| 2012/0308202 A1 | 12/2012 | Murata et al. |
| 2012/0313971 A1 | 12/2012 | Murata et al. |
| 2012/0315011 A1 | 12/2012 | Messmer et al. |
| 2012/0321058 A1 | 12/2012 | Eng et al. |
| 2012/0323645 A1 | 12/2012 | Spiegel et al. |
| 2012/0324512 A1 | 12/2012 | Cahnbley et al. |
| 2013/0027425 A1 | 1/2013 | Yuan |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0055112 A1 | 2/2013 | Joseph et al. |
| 2013/0061054 A1 | 3/2013 | Niccolai |
| 2013/0063542 A1 | 3/2013 | Bhat et al. |
| 2013/0086633 A1 | 4/2013 | Schultz |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0094647 A1 | 4/2013 | Mauro et al. |
| 2013/0113602 A1 | 5/2013 | Gilbertson et al. |
| 2013/0113827 A1 | 5/2013 | Forutanpour et al. |
| 2013/0120522 A1 | 5/2013 | Lian et al. |
| 2013/0124551 A1 | 5/2013 | Foo |
| 2013/0129252 A1 | 5/2013 | Lauper et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0182063 A1 | 7/2013 | Jaiswal et al. |
| 2013/0185672 A1 | 7/2013 | McCormick et al. |
| 2013/0198629 A1 | 8/2013 | Tandon et al. |
| 2013/0210496 A1 | 8/2013 | Zakarias et al. |
| 2013/0211826 A1 | 8/2013 | Mannby |
| 2013/0212202 A1 | 8/2013 | Lee |
| 2013/0215215 A1 | 8/2013 | Gage et al. |
| 2013/0219278 A1 | 8/2013 | Rosenberg |
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0235866 A1 | 9/2013 | Tian et al. |
| 2013/0242030 A1 | 9/2013 | Kato et al. |
| 2013/0243213 A1 | 9/2013 | Moquin |
| 2013/0252669 A1 | 9/2013 | Nhiayi |
| 2013/0263020 A1 | 10/2013 | Heiferman et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0325970 A1 | 12/2013 | Roberts et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040404 A1 | 2/2014 | Pujare et al. |
| 2014/0040819 A1 | 2/2014 | Duffy |
| 2014/0063174 A1 | 3/2014 | Junuzovic et al. |
| 2014/0068452 A1 | 3/2014 | Joseph et al. |
| 2014/0068670 A1 | 3/2014 | Timmermann et al. |
| 2014/0078182 A1 | 3/2014 | Utsunomiya |
| 2014/0108486 A1 | 4/2014 | Borzycki et al. |
| 2014/0111597 A1* | 4/2014 | Anderson ............ H04L 12/1827 348/14.03 |
| 2014/0136630 A1 | 5/2014 | Siegel et al. |
| 2014/0157338 A1 | 6/2014 | Pearce |
| 2014/0161243 A1 | 6/2014 | Contreras et al. |
| 2014/0195557 A1 | 7/2014 | Oztaskent et al. |
| 2014/0198175 A1 | 7/2014 | Shaffer et al. |
| 2014/0237371 A1 | 8/2014 | Klemm et al. |
| 2014/0253671 A1 | 9/2014 | Bentley et al. |
| 2014/0280595 A1 | 9/2014 | Mani et al. |
| 2014/0282213 A1 | 9/2014 | Musa et al. |
| 2014/0296112 A1 | 10/2014 | O'Driscoll et al. |
| 2014/0298210 A1 | 10/2014 | Park et al. |
| 2014/0317561 A1 | 10/2014 | Robinson et al. |
| 2014/0337840 A1 | 11/2014 | Hyde et al. |
| 2014/0351327 A1 | 11/2014 | Huang et al. |
| 2014/0358264 A1 | 12/2014 | Long et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0029301 A1 | 1/2015 | Nakatomi et al. |
| 2015/0067552 A1 | 3/2015 | Leorin et al. |
| 2015/0070835 A1 | 3/2015 | Mclean |
| 2015/0074189 A1 | 3/2015 | Cox et al. |
| 2015/0081885 A1 | 3/2015 | Thomas et al. |
| 2015/0082350 A1 | 3/2015 | Ogasawara et al. |
| 2015/0085060 A1 | 3/2015 | Fish et al. |
| 2015/0088575 A1 | 3/2015 | Asli et al. |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0113369 A1 | 4/2015 | Chan et al. |
| 2015/0128068 A1 | 5/2015 | Kim |
| 2015/0172120 A1 | 6/2015 | Dwarampudi et al. |
| 2015/0178626 A1 | 6/2015 | Pielot et al. |
| 2015/0215365 A1 | 7/2015 | Shaffer et al. |
| 2015/0254760 A1 | 9/2015 | Pepper |
| 2015/0288774 A1 | 10/2015 | Larabie-Belanger |
| 2015/0301691 A1 | 10/2015 | Qin |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0350126 A1 | 12/2015 | Xue |
| 2015/0373063 A1 | 12/2015 | Vashishtha et al. |
| 2015/0373414 A1 | 12/2015 | Kinoshita |
| 2016/0037304 A1 | 2/2016 | Dunkin et al. |
| 2016/0043986 A1 | 2/2016 | Ronkainen |
| 2016/0044159 A1 | 2/2016 | Wolff et al. |
| 2016/0044380 A1 | 2/2016 | Barrett |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0070758 A1 | 3/2016 | Thomson et al. |
| 2016/0071056 A1 | 3/2016 | Ellison et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0110056 A1 | 4/2016 | Hong et al. |
| 2016/0165056 A1 | 6/2016 | Bargetzi et al. |
| 2016/0173537 A1 | 6/2016 | Kumar et al. |
| 2016/0182580 A1 | 6/2016 | Nayak |
| 2016/0266609 A1 | 9/2016 | McCracken |
| 2016/0269411 A1 | 9/2016 | Malachi |
| 2016/0277461 A1 | 9/2016 | Sun et al. |
| 2016/0283909 A1 | 9/2016 | Adiga |
| 2016/0307165 A1 | 10/2016 | Grodum et al. |
| 2016/0309037 A1 | 10/2016 | Rosenberg et al. |
| 2016/0321347 A1 | 11/2016 | Zhou et al. |
| 2017/0006162 A1 | 1/2017 | Bargetzi et al. |
| 2017/0006446 A1 | 1/2017 | Harris et al. |
| 2017/0070706 A1 | 3/2017 | Ursin et al. |
| 2017/0093874 A1 | 3/2017 | Uthe |
| 2017/0104961 A1 | 4/2017 | Pan et al. |
| 2017/0171260 A1 | 6/2017 | Jerrard-Dunne et al. |
| 2017/0324850 A1 | 11/2017 | Snyder et al. |

(56) References Cited

U.S. PATENT DOCUMENTS

FOREIGN PATENT DOCUMENTS

| | | |
|---|---|---|
| CN | 102572370 | 7/2012 |
| CN | 102655583 | 9/2012 |
| CN | 101729528 | 11/2012 |
| CN | 102938834 | 2/2013 |
| CN | 103141086 | 6/2013 |
| CN | 204331453 | 5/2015 |
| DE | 3843033 | 9/1991 |
| EP | 959585 | 11/1999 |
| EP | 2773131 | 9/2014 |
| EP | 2341686 | 8/2016 |
| WO | WO 98/55903 | 12/1998 |
| WO | WO 2008/139269 | 11/2008 |
| WO | WO 2012/167262 | 12/2012 |
| WO | WO 2014/118736 | 8/2014 |

OTHER PUBLICATIONS

Author Unknown, "'I can see the future" 10 predictions concerning cell-phones," Surveillance Camera Players, http://www.notbored.org/cell-phones.html, Jun. 21, 2003, 2 pages.
Author Unknown, "Active screen follows mouse and dual monitors," KDE Community Forums, Apr. 13, 2010, 3 pages.
Author Unknown, "Implementing Media Gateway Control Protocols" A RADVision White Paper, Jan. 27, 2002, 16 pages.
Author Unknown, "Manage Meeting Rooms in Real Time," Jan. 23, 2017, door-tablet.com, 7 pages.
Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).
Cisco Systems, Inc., "Cisco WebEx Meetings Server System Requirements release 1.5." 30 pages, Aug. 14, 2013.
Cisco White Paper, "Web Conferencing: Unleash the Power of Secure, Real-Time Collaboration," pp. 1-8, 2014.
Clarke, Brant, "Polycom Announces RealPresence Group Series," "Polycom Announces RealPresence Group Series" dated Oct. 8, 2012 available at http://www.323.tv/news/polycom-realpresence-group-series (last accessed Oct. 11, 2013).
Clauser, Grant, et al., "Is the Google Home the voice-controlled speaker for you?," The Wire Cutter, Nov. 22, 2016, pp. 1-15.
Cole, Camille, et al., "Videoconferencing for K-12 Classrooms," Second Edition (excerpt), http://www.iste.org/docs/excerpts/VIDCO2-excerpt.pdf (last accessed Oct. 11, 2013), 2009.
Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last accessed Oct. 11, 2013).
Infocus, "Mondopad," Mondopad. http://www.infocus.com/sites/default/files/InFocus-Monopad-IN5520a-INF7021-Datasheet-EN.pdf (last accessed Oct. 11, 2013), 2013.
MacCormick, John, "Video Chat with Multiple Cameras," CSCW '13, Proceedings of the 2013 conference on Computer supported cooperative work companion, pp. 195-198, ACM, New York, NY, USA, 2013.
Microsoft, "Positioning Objects on Multiple Display Monitors," Aug. 12, 2012, 2 pages.
Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900660 dated Oct. 12, 2011 (last accessed Nov. 12, 2013).
Nu-Star Technologies, "Interactive Whiteboard Conferencing," Interactive Whiteboard Conferencing. http://www.nu-star.com/interactive-conf.php dated 2013 (last accessed Oct. 11, 2013).
Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.
Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.
Polycom, "Polycom UC Board, Transforming ordinary surfaces into virtual whiteboards" 2012, Polycom, Inc., San Jose, CA, http://www.uatg.com/pdf/polycom/polycom-uc-boarcd-datasheet.pdf, (last accessed Oct. 11, 2013).
Stevenson, Nancy, "Webex Web Meetings for Dummies" 2005, Wiley Publishing Inc., Indianapolis, Indiana, USA, 339 pages.
Stodle. Daniel, et al., "Gesture-Based, Touch-Free Multi-User Gaming on Wall-Sized, High-Resolution Tiled Displays," 2008, 13 pages.
Thompson, Phil, et al., "Agent Based Ontology Driven Virtual Meeting Assistant," Future Generation Information Technology, Springer Berlin Heidelberg, 2010, 4 pages.
Tno, "Multi-Touch Interaction Overview," Dec. 1, 2009, 12 pages.
Toga, James, et al., "Demystifying Multimedia Conferencing Over the Internet Using the H.323 Set of Standards," Intel Technology Journal Q2, 1998, 11 pages.
Ubuntu, "Force Unity to open new window on the screen where the cursor is?" Sep. 16, 2013, 1 page.
VB Forums, "Pointapi," Aug. 8, 2001, 3 pages.
Vidyo, "VidyoPanorama," VidyoPanorama-http://www.vidyo.com/products/vidyopanorama/ dated 2013 (last accessed Oct. 11, 2013).
Choi, Jae Young, et al; "Towards an Automatic Face Indexing System for Actor-based Video Services in an IPTV Environment," IEEE Transactions on 56, No. 1 (2010): 147-155.
Cisco Systems, Inc. "Cisco webex: WebEx Meeting Center User Guide for Hosts, Presenters, and Participants" © 1997-2013, pp. 1-394 plus table of contents.
Cisco Systems, Inc., "Cisco Webex Meetings for iPad and iPhone Release Notes," Version 5.0, Oct. 2013, 5 pages.
Cisco Systems, Inc., "Cisco Unified Personal Communicator 8.5", 2011, 9 pages.
Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.
Grothaus, Michael, "How Interactive Product Placements Could Save Television," Jul. 25, 2013, 4 pages.
Hannigan, Nancy Kruse, et al., The IBM Lotus Samteime VB Family Extending the IBM Unified Communications and Collaboration Strategy (2007), available at http://www.ibm.com/developerworks/lotus/library/sametime8-new/, 10 pages.
Hirschmann, Kenny, "TWIDDLA: Smarter Than the Average Whiteboard," Apr. 17, 2014, 2 pages.
Nyamgondalu, Nagendra, "Lotus Notes Calendar and Scheduling Explained!" IBM, Oct. 18, 2004, 10 pages.
Schreiber, Danny, "The Missing Guide for Google Hangout Video Calls," Jun. 5, 2014, 6 pages.
Shervington, Martin, "Complete Guide to Google Hangouts for Businesses and Individuals," Mar. 20, 2014, 15 pages.
Shi, Saiqi, et al, "Notification That a Mobile Meeting Attendee Is Driving", May 20, 2013, 13 pages.

* cited by examiner

IN-MEETING GRAPHICAL USER INTERFACE DISPLAY USING CALENDAR INFORMATION AND SYSTEM

TECHNICAL FIELD

The present technology pertains to meeting applications, and more specifically pertains to incorporating calendar information into an in-meeting graphical user interface for a meeting application.

BACKGROUND

Organizations of people typically will use software to help coordinate meetings. For example, they might user a calendaring system to send out meeting invitations and receive responses for the meeting invitations. Such a meeting can be conducted using software, such as video conferencing software. During the meeting, a meeting host will typically have to switch between a meeting application to a calendaring application to determine who accepted the meeting invitation and then to a communication application to contact invitees who accepted but are not present.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for an improved in-meeting graphical user interface (GUI) that uses calendar information. This improved in-meeting GUI can receive meeting data (e.g., a video stream) for a meeting service and receive calendar information (e.g., the meeting start time, end time, participants, participants' acceptance status, etc.) from a calendaring service. Using the calendar information, the in-meeting GUI can present the participants' status, a timer showing when the meeting is scheduled to end, and a variety of additional features. The in-meeting GUI can further use the calendar information to contact invitees that have not yet joined the meeting. For example, to remind them to join or to have them join via telephone.

EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for incorporating calendar information, presence tools, and communication tools, into an in-meeting graphical user interface for a meeting application.

The meeting application described herein can gather calendar information from a calendaring service, even if that calendaring service is independent from (e.g., a "third party to") the meeting service. The meeting application can incorporate the calendar information into an in-meeting graphical user interface so that the calendar information can be displayed with the meeting. In some embodiments, this includes listing all invitees and participants alongside their associated acceptance status (e.g., are they present, did they accept, did they decline, etc.). In some embodiments, the calendar information can inform a meeting timer that can indicate the remaining time for the meeting. In some embodiments, the calendar information can inform individual timers that indicate how much time individual participants have before their next appointment.

Figure 1:
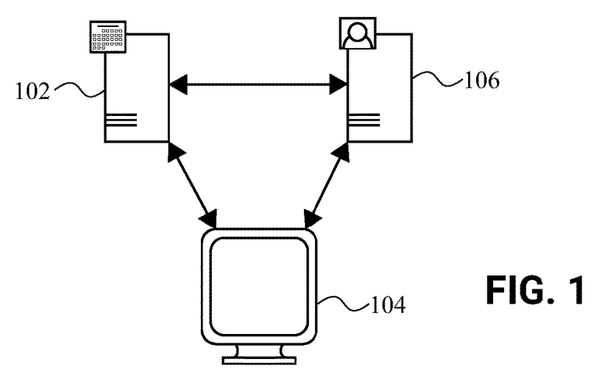
FIG. 1 shows a client device in communication with a calendaring service and a meeting service.

FIG. 1 shows client device 104 in communication with calendaring service 102 and meeting service 106. Client device 104 can run a calendar application (including a web application) that can view and modify a calendar associated with a user account. A calendar item can be created on client device 104 and sent to or synchronized with calendaring service 102. Calendaring service 102 can manage calendar (s) for various user account(s). Calendaring service 102 can facilitate sharing of calendars so that one user can view the calendar of another user. A calendar item can have a starting date and time, an ending date and time, a location (e.g., room number, dial-in number, web address, etc.), notes, attendees, participants, etc. Calendaring service 102 can send invitations for a user or group of users to join a calendar item; calendaring service 102 can keep track of responses to such invitations.

Meeting service 106 can facilitate meetings between various users. Facilitating meetings can include coordinating the intercommunication of messages, video streams, audio streams, screen shares, etc. between participants (on respective client devices 104). Meeting service 106 can send (or facilitate the sending of) the data mentioned above—the messages, video streams, audio streams, screen shares, etc. to client device 104. Client device 104 can run a meeting graphical user interface to represent the data received from meeting service 106.

In some embodiments, calendaring service 102 is a "third-party" to meeting service 106. For example, calendaring service 102 can be operated by one service provider and meeting service 106 can be operated by another service provider.

In some embodiments, a calendar item can be associated with a meeting hosted by meeting service 106. For example, when the calendar item is sent to participants, the participant can select a link in the invitation to join an associated meeting hosted by meeting service 106. When a host creates the calendar item for the meeting, meeting service can "reserve" resources for the meeting to use. For example, the meeting service can reserve a link, a meeting number, bandwidth, etc. In some embodiments, each user account associated with meeting service 106 has his or her dedicated meeting "room" and when that user creates a calendar item for a meeting, the user's dedicated room is assigned to that calendar item.

A variety of techniques can be used to create a calendar item, reserve resources of the meeting service for a meeting, and associate the calendar item with the meeting. For example, a host can create a calendar item using a calendaring application. The calendaring application can send a request to reserve resources to the meeting service. The request can also provide an identifier for the calendar item. When the calendaring application sends the request to the meeting service, the meeting service can return a meeting identifier. In some embodiments, the calendaring service sends the request to reserve resources (instead of, or on behalf of, the calendar application) to the meeting service and similarly receives the meeting identifier. In some embodiments, the calendaring application can send the request to reserve resources to the meeting application and can receive a meeting identifier in response.

In some embodiments, a host uses a meeting application to send a meeting request to the meeting service to reserve resources for a meeting; the meeting service can return a meeting identifier. The meeting application can also send a request to calendaring service to create a calendar item; the request can include the meeting identifier so that the calendaring service can associate the calendar item with the meeting identifier. The calendaring service can then return an identifier for the calendar item which the meeting application can send to the meeting service for association with the meeting. In some embodiments, the meeting service (instead of or on behalf of the meeting application) sends the request to create a calendar item and, in the request, provides a meeting identifier. The calendaring service can then return a calendar item identifier for association with the meeting. In some embodiments, the meeting application can send the request to create a calendar item to the calendar application and can receive a calendar item identifier in response.

In some embodiments, a host can manually associate meeting resources with a calendar item. For example, the host can supply a meeting identifier to the calendaring service and/or a calendar item identifier to the meeting service. In some embodiments, the calendar application and meeting application are two modules as a part of a single organization application.

In some embodiments, the calendaring service and/or calendar application can get up-to-date information for the meeting from the meeting service using the meeting identifier and a meeting service application programming interface (API). In this way, the calendaring service and/or calendar application can receive up-to-date information from the meeting service about meeting resources etc. The calendaring application can benefit from meeting information (e.g., include a phone number to join the meeting within the calendar item, indicate who is currently in the meeting, indicate whether the meeting has ended early, etc.).

Similarly, in some embodiments the meeting service and/or meeting application can get up-to-date information for the calendar item from the calendaring service using the calendar item identifier and the calendaring service API. In this way, the meeting application can then benefit from calendar item information (e.g., who is invited to the meeting, who has accepted invitations, contact information for invitees, invitees' schedules, etc.). In some embodiments, the meeting service and/or meeting application can get up-to-date information for the calendar item from the calendaring service via one or more notifications broadcast by the calendaring service. The notifications may be synchronous or asynchronous.

Communications between calendaring service (or calendar application) and meeting service (or meeting application) can utilize a calendar item identifier or meeting identifier to specify the calendar item or meeting for the request.

Client device 104 can run a calendar application that interfaces (i.e., communicate with) with calendaring service 102 and a meeting application hosting a meeting graphical user interface that interfaces with meeting service 106. The meeting application can also interface with calendaring service 102 and calendar application. Similarly, calendar application can interface with meeting service 106 and meeting graphical user interface. Meeting service 106 and calendaring service 102 can intercommunicate. Therefore, it should be understood that any application, service, or device can acquire data from any other application, service, or device—even at times going through another application, service, or device. For example, meeting graphical user interface can request information associated with a calendar item from meeting service 106; for example the calendar item can be a calendar item associated with a current meeting. Meeting service 106 can acquire that information from calendaring service 102. In some embodiments, calendar application and meeting application are the same application, and in some embodiments they are hosted by unrelated service providers. In some embodiments, calendar and/or meeting application are web applications that are rendered on client device 104.

Figure 2:
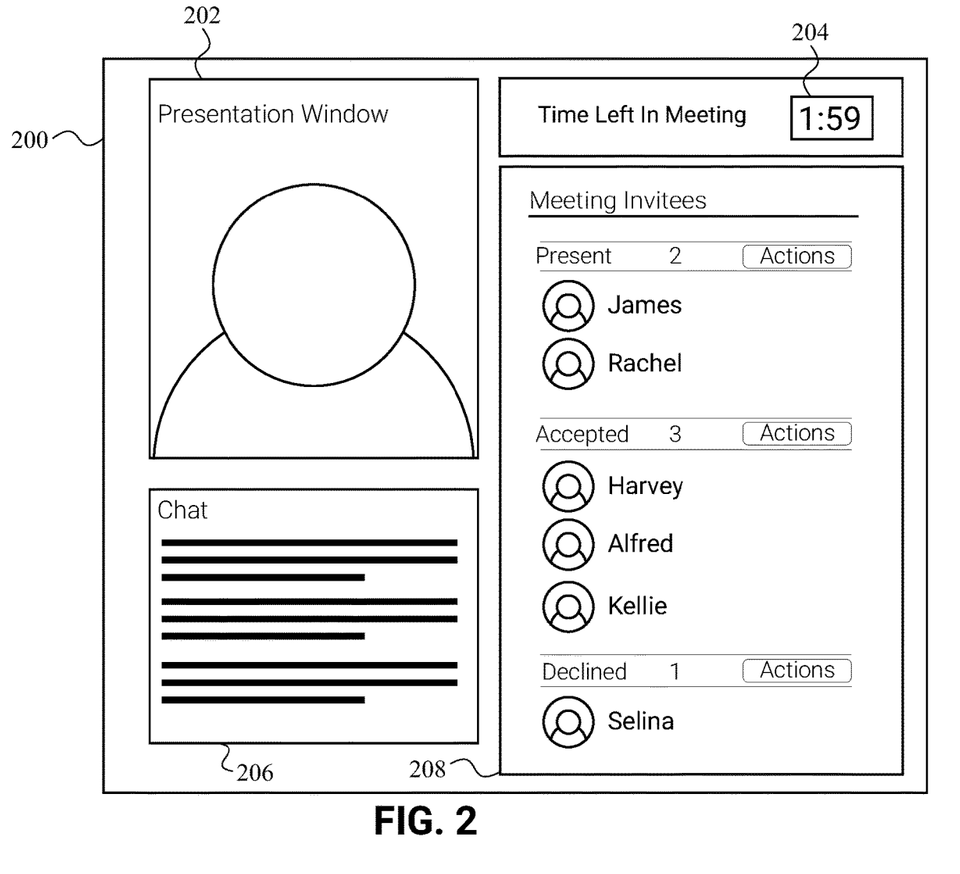
FIG. 2 shows an example meeting-in-progress graphical user interface.

FIG. 2 shows an example meeting-in-progress graphical user interface 200 ("meeting GUI 200"). Meeting GUI 200 can be presented to a user before a meeting, after a meeting, or during a meeting (e.g., while the meeting is in-progress). Meeting GUI 200 can be presented on client device 104 and hosted by a meeting application. In some embodiments, multiple users on various client devices 104 can be presented with similar, although not necessarily identical, meeting GUIs 200 corresponding to the same meeting.

Meeting GUI 200 can include presentation window 202. Presentation window 202 can include a video stream from other meeting attendees, a screen share of another attendee, etc. Meeting GUI 200 can include chat window 206 which can contain messages from meeting attendees. Meeting GUI 200 can include meeting timer 204 which can display the amount of time left in the meeting. Meeting GUI can include roster 208 of invited meeting participants and their current status associated with the meeting.

Figure 3A:
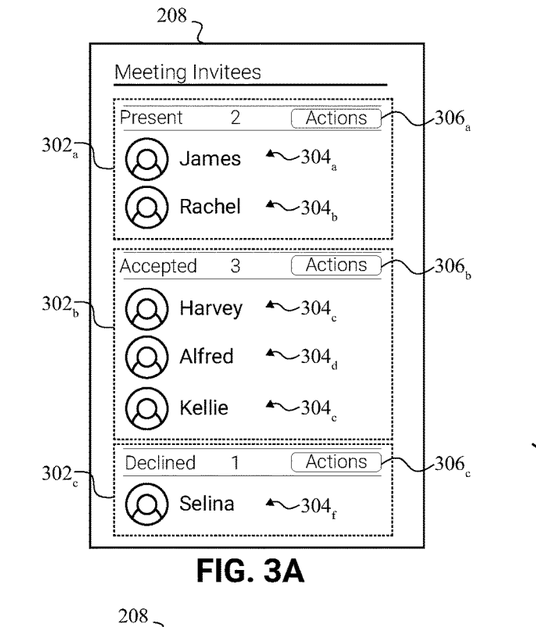
FIGS. 3A, 3B, 3C, 3D, and 3E show various example rosters.
Figure 3B:
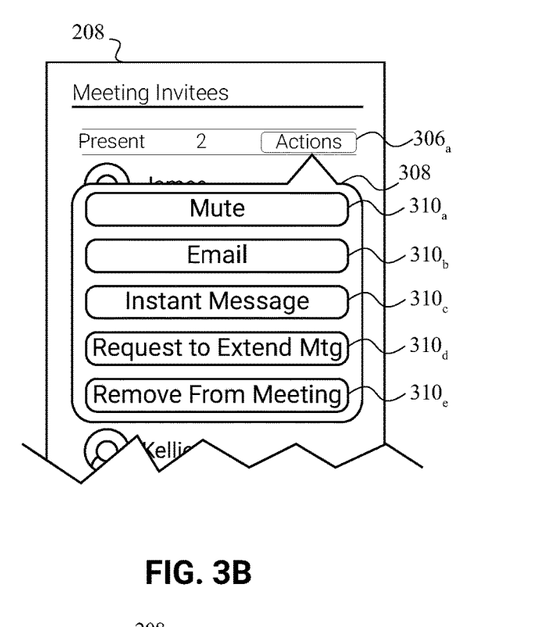
Figure 3C:
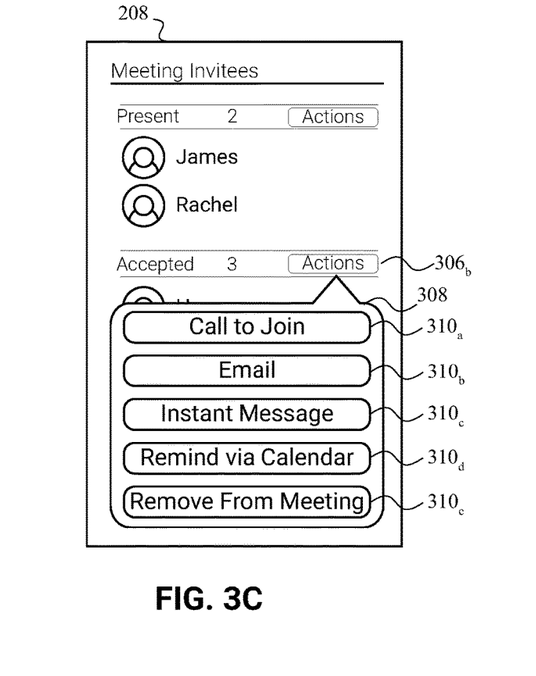
Figure 3D:
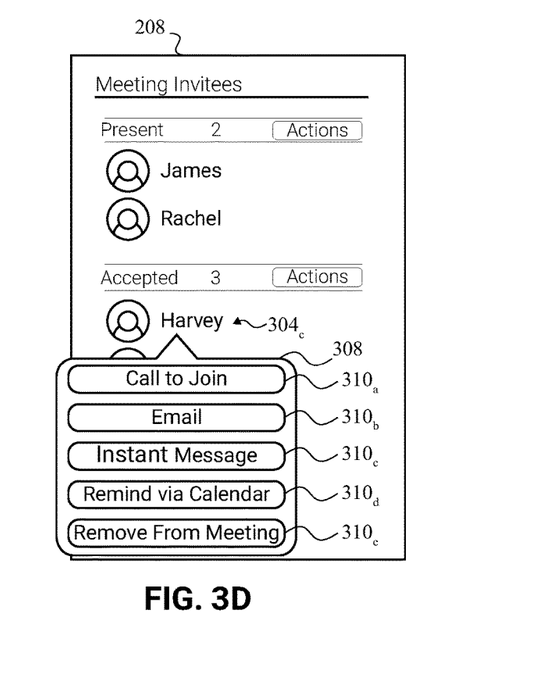
Figure 3E:
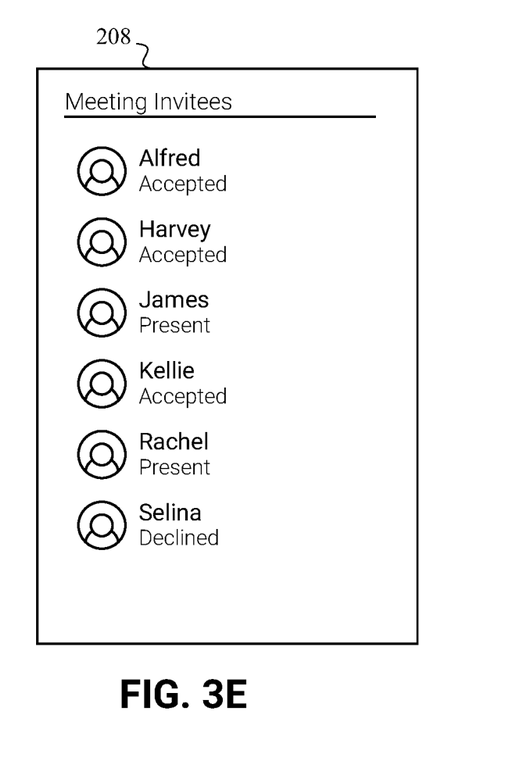

FIGS. 3A-3E show various example rosters 208. In FIG. 3A, roster 208 organizes invited meeting participants $304_a$-$304_f$ (generically, "participant 304") into groups $302_a$-$302_c$ (generically, "group 302") according to their accepted status. For example, James (participant $304_a$) and Rachel (participant $304_b$) are both "present" while Harvey, Alfred, and Kellie (participants 304$_c$-304$_e$, respectively) are "accepted" and Selina (participant 304$_g$) is "declined". Accepted status can refer to any combination of a participant's 304 response to an event item invitation (e.g., "accept", "decline", "maybe", "interested", "ignore", "not-invited", etc.), the event item's transmission status for a participant 304 (e.g., "received", "viewed", "error", etc.), the participant's 304 current attendance status (e.g., "present", "muted", "view-only", etc.), the user's connection method (e.g., connected via telephone, conference facility, personal computer, etc.), and any other attribute that can describe the participant's 304 status. In some embodiments, participants 304 can be hidden within group 302—this can be useful when large numbers of participants 304 are a part of a group.

In some embodiments, a participant's 304 accepted status can be informed based on calendaring service 102. For example, meeting service 106 can communicate via an API to calendaring service 102 to retrieve accepted status information which can then be sent to client device 104. In some embodiments, meeting service 106 can receive one or more notifications from calendaring service 102, wherein the notifications contain accepted status information which can be read and then sent to client device 104. Other information can be retrieved from calendaring service 102 for the purpose of being presented in the meeting GUI 200, through one or more of the API or the notifications. For example, this information can include other calendar items for a participant 304, contact information for a participant 304, current location of a participant 304, etc. A participant's 304 accepted status can also be informed by other data sources such as social media, employee directories, government databases, etc.

In FIG. 3A, group 302$_a$ represents "present" participants 304 which can mean participants 304 that have received an invitation, accepted the invitation, and are present. Group 302$_b$ represents "accepted" participants 304 which can mean participants 304 that have received an invitation, accepted the invitation, and are not currently present in the meeting. Group 302$_e$ represents a participant 304 that has "declined" the invitation and is not present. It should be understood that groupings can be based on various statuses and have various labels. A participant 304 can be in multiple groups 302. It should be understood that the principles disclosed herein for a participant 304 can also apply to users that are not invited, are requesting to join, are the host, etc. In some embodiments, roster 208 can place the current user (i.e., the user that is viewing roster 208) in a separate group 302.

Action buttons 306 can be selectable objects that can provide a user with a way to interact with participants 304 in a group 302. For example, in FIG. 3B, selecting action button 306$_a$ can trigger action menu 308 which can have multiple action buttons 310 for interacting with participants 304. For example, selecting action button 310$_a$ in FIG. 3B can mute the participants 304 of the respective group 302. Action buttons 310 can be a contact-participant user interface object. For example, action button 310$_b$ can initiate emails to each participant 304 individually or one email to all participants 304 of the group 302. Similarly, other action buttons 310 can initiate actions individually or to the group 302. Other action buttons include instant message (action button 310$_c$), request to extend meeting (action button 310$_d$ of FIG. 3B), remove from meeting (action button 310$_e$), create meeting (e.g., for a future meeting), etc.

Action menu 308 can be contextual and provide different action buttons 310 based on the group 302 associated with the action button 306. For example, in FIG. 3C action button 306$_b$ is associated with group 302$_b$ which includes participants 304 that have accepted the meeting invitation but aren't present; because they are not present, action menu 308 includes action button 310$_d$ to "remind via calendar" which can send out a calendar reminder to those participants 302. Other context-specific action buttons 310 are contemplated. For example, a button to get the location of an absent participant 302, a button to contact an assistant of an absent participant 302, a button to allow an uninvited user to join meeting, a button to call a participant to have them join via telephone (action button 310$_a$ of FIG. 3C), etc.

In some embodiments, action menu 308 can be activated when a participant 304 is selected. This can be an action menu 308 specific to that participant 304. For example, Harvey (participant 304$_c$) of FIG. 3D can trigger action menu 308. In such embodiments, action menu 308 can contain contextual action buttons 310 as described above. In some embodiments, action menu 308 can be triggered by selecting action button 306 or participant 304.

In some embodiments, participants 304 can be organized according to various systems. For example, in FIG. 3E participants 304 are organized alphabetically. In some embodiments, participants 304 can have an indicator that indicates their status (e.g., "accepted", "present", "declined", etc.

Figure 4:
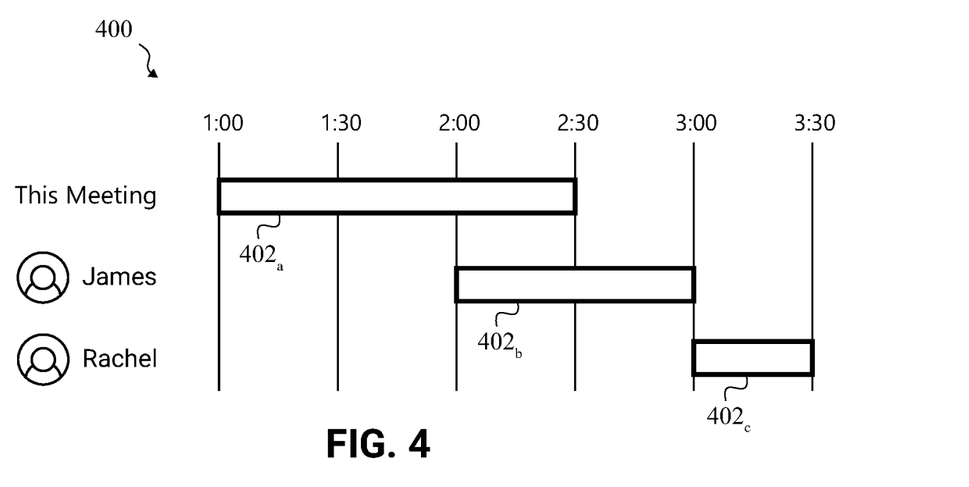
FIG. 4 shows an example timeline with various schedules.

Meeting timer 204 (shown in FIG. 2) can represent the amount of time remaining for the current meeting. Meeting timer 204 can be calculated based on various parameters as shown in FIG. 4. For example, meeting timer can be calculated based on this meeting's schedule 402$_a$, a participant's schedule (e.g., schedule 402$_b$ or schedule 402$_c$), a schedule for a conference room, a schedule for a resource (e.g., Telephone Bridge), etc. For example, even though this meeting's schedule 402$_a$ does not end until 2:30, meeting timer 204 can show a countdown until 2:00 because that is when James' schedule 204$_b$ has him at another meeting. Meeting timer 204 can also represent how late the meeting can be extended. For example, this meeting's schedule 402$_a$ ends after James is scheduled to be busy but Rachel can remain on the meeting until 3:00 (as indicated by schedule 402$_c$), therefore the meeting can be extended until 3:00 without causing scheduling problems with any participant 304. When calculating meeting timer 204, travel time, inter-meeting breaks, set up time, etc. can be accounted for. In some embodiments, meeting timer 204 can be shown only when relevant (e.g., when there is only a short amount of time left in the meeting). Meeting timer 204 can be overlaid on top of presentation window 202.

In some embodiments, when meeting timer 204 shows that the meeting should be over, the meeting can automatically end and close connections between participants. This can help ensure meetings do not exceed their allotted time.

As introduced above, an action button 310 can be selected to suggest to extend the meeting. If a user selects such an action button 310, the meeting application can send such a suggestion only to those that are able to remain after the meeting's scheduled end time.

Figure 5:
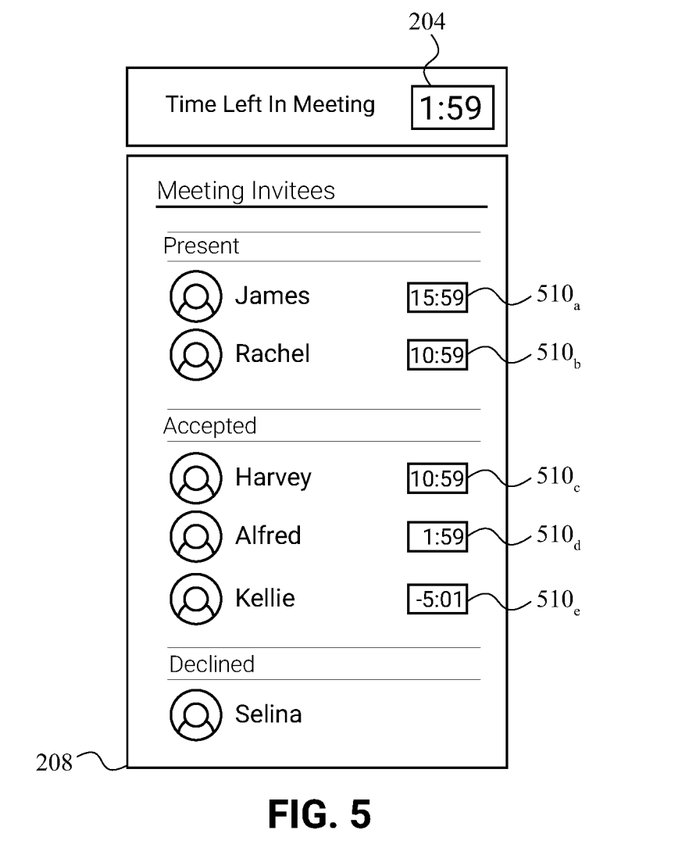
FIG. 5 shows an example roster with individual timers.

FIG. 5 shows individual timers 510$_a$-510$_e$ (generically, "individual timer 510") within roster 208. Individual timers 510 can represent the availability of the respective participant 302. The principles for meeting timer 204 can be applied to individual timers 510. For example, individual timer 510$_a$ for James can show that he has 15 minutes and 59 seconds of availability while individual timer 510$_e$ for Kellie has negative 5 minutes and 1 second of availability. Negative availability can indicate that a participant 302 is late for another calendar item.

Information for calculating individual timers 510 can be retrieved according to the principles herein disclosed. For example, client device 104 can retrieve this data from calendaring service 102. It can also be retrieved via meeting service 106.

Figure 6:
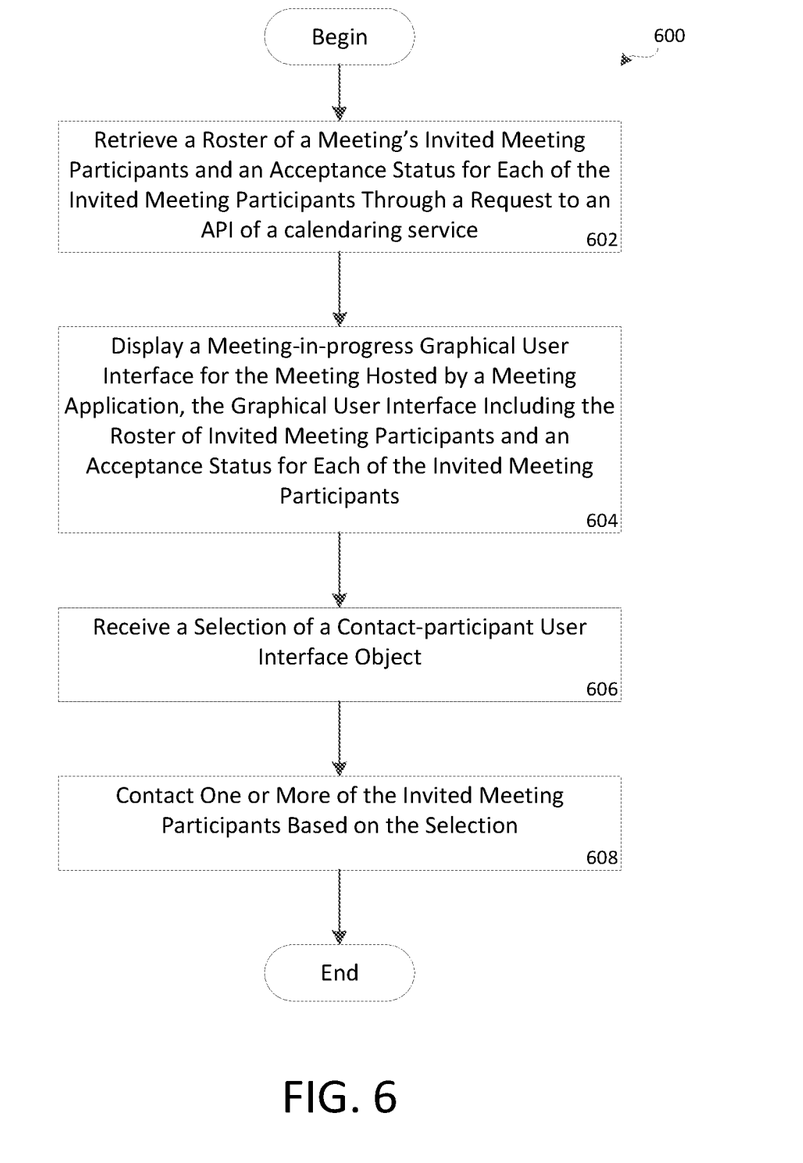
FIG. 6 shows an example method for using calendar information to contact a participant.

FIG. 6 shows an example method 600 according to some embodiments. A system performing example method 600 can begin and retrieve a roster of a meeting's invited meeting participants and an acceptance status for each of the invited meeting participants through a request to an API of a calendaring service (step 602). In some embodiments, the system may receive one or more notifications from a calendaring service, where the notifications contain data underlying the roster of a meeting's invited meeting participants and an acceptance status for each of the invited meeting participants. One notification can contain all of the necessary data, or the data can be split across multiple notifications. The notifications may be asynchronous.

The system can then display a meeting-in-progress graphical user interface for the meeting hosted by a meeting application, the graphical user interface including the roster of invited meeting participants and an acceptance status for each of the invited meeting participants (step 604). The meeting-in-progress graphical user interface can include a contact-participant user interface object (e.g., action button 306). The contact-participant user interface object can be effective to receive a selection of the contact-participant user interface object. As a result of such a selection, the contact-participant interface object can be effective to automatically contact one or more of the invited meeting participants.

The system can then receive a selection of a contact-participant user interface object (step 606). The system can then contact one or more of the invited meeting participants based on the selection (step 608). For example, the one or more of the invited meeting participants can correspond with the selection. If the selected user interface object is associated with a group 302, then step 608 can include contacting each meeting participant of the group.

Figure 7:
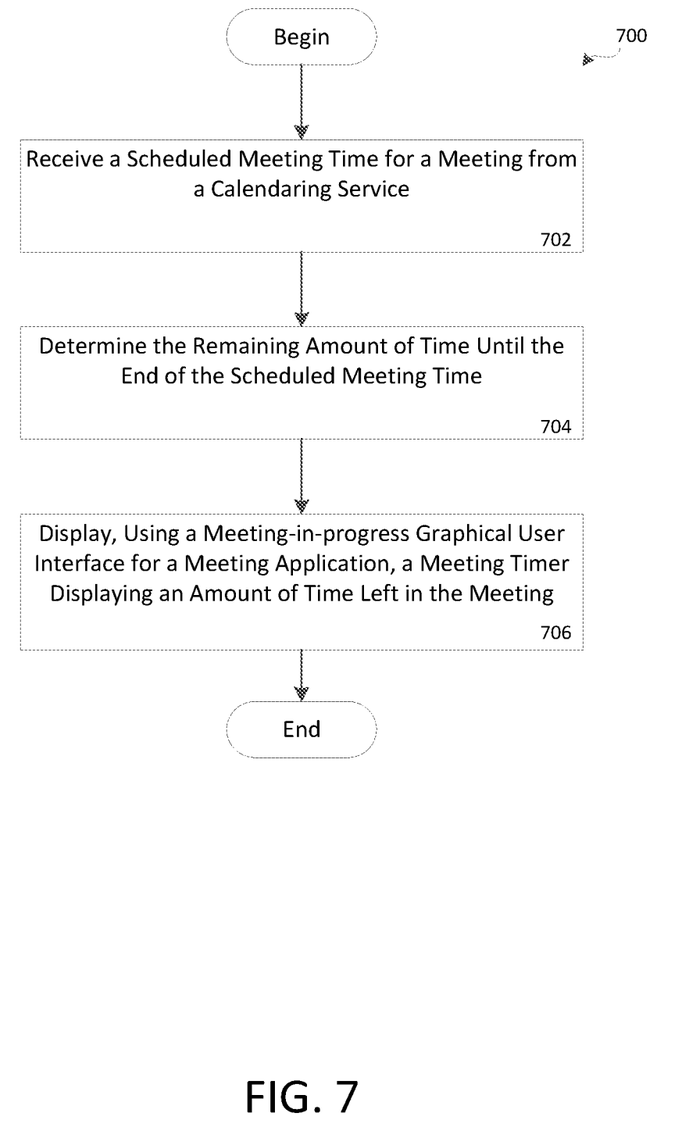
FIG. 7 shows an example method for using calendar information to set a meeting timer.
Figure 8A:
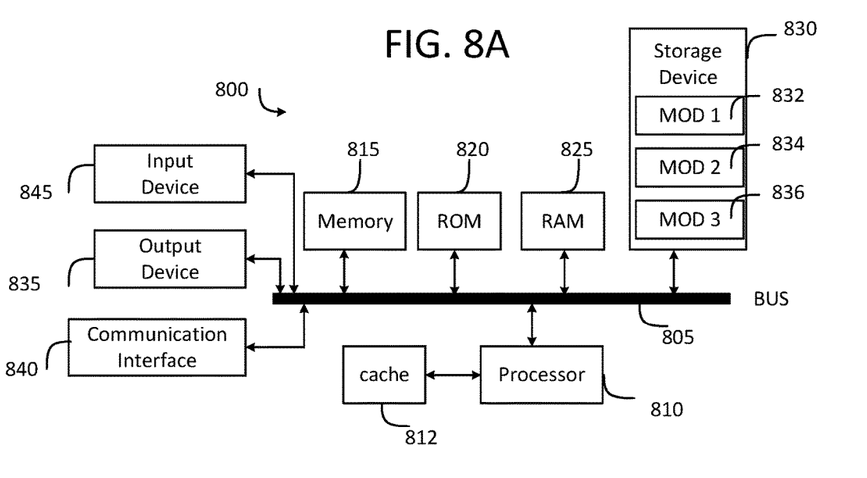
FIGS. 8A and 8B illustrate example system embodiments.
Figure 8B:
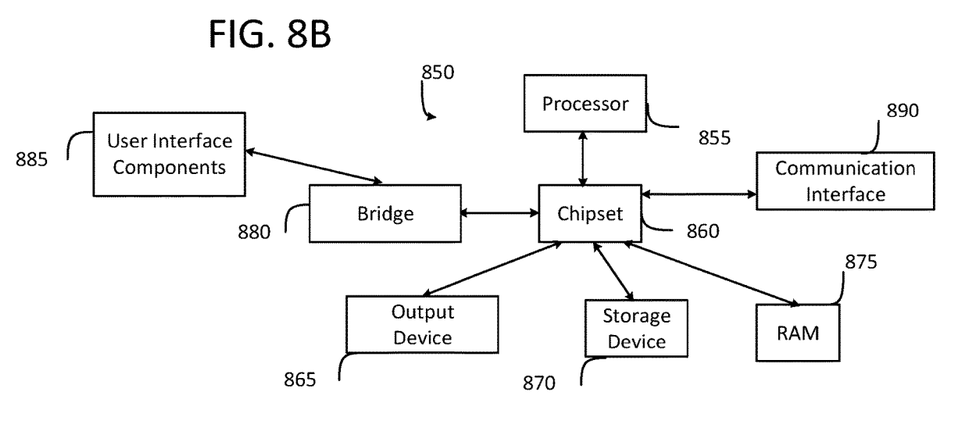

FIG. 7 shows an example method 700 according to some embodiments. A system performing example method 700 can begin and receive a scheduled meeting time for a meeting from a calendaring service (step 702). The scheduled meeting time can include a start time, an end time, a duration, etc. The system can then determine the remaining amount of time until the end of the scheduled meeting time (step 704). The system can then display, using a meeting-in-progress graphical user interface for a meeting application, a meeting timer displaying an amount of time left in the meeting (step 706).

FIG. 7A, and FIG. 7B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer-readable medium comprising computer executable instructions stored thereon, the instructions when executed are effective to cause a computer to:

display, via a display, a meeting-in-progress graphical user interface for a meeting hosted by a meeting application, the graphical user interface including a roster of invited meeting participants based on an acceptance status for each of the invited meeting participants, the roster including a first listing of any present ones of the invited meeting participants, a second listing of any accepted ones of the invited meeting participants, and a third listing of any declined ones of the invited meeting participants, wherein, at least one of the first listing, the second listing, or the third listing of the acceptance status includes a first menu of available actions for a first grouping of the invited meeting participants, another one of the first listing, the second listing, or the third listing of the acceptance status includes a second menu of available actions for a second grouping of the invited meeting participants, and selection of one or more actions in the first menu of available actions or the second menu of available actions causes the one or more actions to be executed for every participant listed in a corresponding one of the first grouping of the invited meeting participants or the second grouping of the invited meeting participants.

2. The computer-readable medium of claim 1, wherein the meeting-in-progress graphical user interface includes a contact-participant user interface object, the contact-participant user interface object being effective to receive a selection of the contact-participant user interface object, and after receipt of the selection, contact one or more of the invited meeting participants.

3. The computer-readable medium of claim 2, wherein the instructions are effective to cause the computer to automatically contact one or more of the invited meeting participants by: creating an instant message using an instant message application and delivering the instant message to the one or more of the invited meeting participants.

4. The computer-readable medium of claim 2, wherein the instructions are effective to cause the computer to contact one or more of the invited meeting participants by: prompting a user to enter a message to create an instant message using an instant message application and delivering the instant message to the one or more of the invited meeting participants.

5. The computer-readable medium of claim 1, wherein,
the first menu of available actions includes a first plurality of interaction options,
the first plurality of interaction options includes mute, email, and instant message,
the second menu of available actions includes a second plurality of interaction options,
the second plurality of interaction options includes call to join and remind via calendar,
the first menu includes at least one action not listed via the second menu, and
the first menu is displayed at a different time than the second menu.

6. The computer-readable medium of claim 1, wherein the meeting-in-progress graphical user interface includes a contact-participant user interface object next to the meeting participants organized into the accepted status, wherein an accepted status means that the participant has accepted a meeting invitation but has not joined the meeting, the contact-participant user interface object being effective to contact the meeting participants organized into the accepted status.

7. The computer-readable medium of claim 1, wherein the instructions are effective to cause the computer to:
retrieve the roster of invited meeting participants and the acceptance status for each of the invited meeting participants through a request to an API of a calendaring service.

8. The computer-readable medium of claim 1, wherein the instructions are effective to cause the computer to:
receive one or more notifications from a calendaring service, the one or more notifications comprising one or more of the roster of invited meeting participants and the acceptance status for each of the invited meeting participants.

9. The computer-readable medium of claim 1, wherein the meeting-in-progress graphical user interface for the meeting application is configured to display a meeting timer, the meeting timer displaying an amount of time left in the meeting, the amount of time left in the meeting being calculated by:
receiving a scheduled meeting time from a calendaring service and determining the remaining amount of time until an end of the scheduled meeting time.

10. A system comprising:
a processor;
a display; and
memory including instructions that when executed by the processor, cause the system to:
display, via the display, a meeting-in-progress graphical user interface for a meeting hosted by a meeting application, the graphical user interface including a roster of invited meeting participants based on an acceptance status for each of the invited meeting participants, the roster including a first listing of any present ones of the invited meeting participants, a second listing of any accepted ones of the invited meeting participants, and a third listing of any declined ones of the invited meeting participants,
wherein,
at least one of the first listing, the second listing, or the third listing of the acceptance status includes a first menu of available actions for a first grouping of the invited meeting participants,
another one of the first listing, the second listing, or the third listing of the acceptance status includes a second menu of available actions for a second grouping of the invited meeting participants, and
selection of one or more actions in the first menu of available actions or the second menu of available actions causes the one or more actions to be executed for every participant listed in a corresponding one of the first grouping of the invited meeting participants or the second grouping of the invited meeting participants.

11. The system of claim 10, wherein the meeting-in-progress graphical user interface includes a contact-participant user interface object, the contact-participant user interface object being effective to receive a selection of the contact-participant user interface object, and after receipt of the selection, contact one or more of the invited meeting participants.

12. The system of claim 11, wherein the instructions are effective to cause the system to automatically contact one or more of the invited meeting participants by: creating an instant message using an instant message application and delivering the instant message to the one or more of the invited meeting participants.

13. The system of claim 11, wherein the instructions are effective to cause the system to contact one or more of the invited meeting participants by: prompting a user to enter a message to create an instant message using an instant message application and delivering the instant message to the one or more of the invited meeting participants.

14. The system of claim 10, wherein,
the first menu of available actions includes a first plurality of interaction options,
the first plurality of interaction options includes mute, email, and instant message,
the second menu of available actions includes a second plurality of interaction options,
the second plurality of interaction options includes call to join and remind via calendar,
the first menu includes at least one action not listed via the second menu, and
the first menu is displayed at a different time than the second menu.

15. The system of claim 10, wherein the meeting-in-progress graphical user interface includes a contact-participant user interface object next to the meeting participants organized into the accepted status, wherein an accepted status means that the participant has accepted a meeting invitation but has not joined the meeting, the contact-participant user interface object being effective to contact the meeting participants organized into the accepted status.

16. The system of claim 10, wherein the instructions are effective to cause the system to:
retrieve the roster of invited meeting participants and the acceptance status for each of the invited meeting participants through a request to an API of a calendaring service.

17. The system of claim 10, wherein the instructions are effective to cause the system to:
receive one or more notifications from a calendaring service, the one or more notifications comprising one or more of the roster of invited meeting participants and the acceptance status for each of the invited meeting participants.

18. The system of claim 10, wherein the meeting-in-progress graphical user interface for the meeting application is configured to display a meeting timer, the meeting timer displaying an amount of time left in the meeting, the amount of time left in the meeting being calculated by:
receiving a scheduled meeting time from a calendaring service and determining the remaining amount of time until an end of the scheduled meeting time.

19. A method comprising:
displaying, via a display, a meeting-in-progress graphical user interface for a meeting hosted by a meeting application, the graphical user interface including a roster of invited meeting participants based on an acceptance status for each of the invited meeting participants, the roster including a first listing of any present ones of the invited meeting participants, a second listing of any accepted ones of the invited meeting participants, and a third listing of any declined ones of the invited meeting participants,
wherein,
at least one of the first listing, the second listing, or the third listing of the acceptance status includes a first menu of available actions for a first grouping of the invited meeting participants,
another one of the first listing, the second listing, or the third listing of the acceptance status includes a second menu of available actions for a second grouping of the invited meeting participants, and
selection of one or more actions in the first menu of available actions or the second menu of available actions causes the one or more actions to be executed for every participant listed in a corresponding one of the first grouping of the invited meeting participants or the second grouping of the invited meeting participants.

20. The method of claim 19, wherein the meeting-in-progress graphical user interface includes a contact-participant user interface object, the contact-participant user interface object being effective to receive a selection of the contact-participant user interface object, and after receipt of the selection, contact one or more of the invited meeting participants.

21. The method of claim 20, further comprising, automatically contacting one or more of the invited meeting participants by: creating an instant message using an instant message application and delivering the instant message to the one or more of the invited meeting participants.

22. The method of claim 20, further comprising contacting one or more of the invited meeting participants by: prompting a user to enter a message to create an instant message using an instant message application and delivering the instant message to the one or more of the invited meeting participants.

23. The method of claim 19,
wherein,
the first menu of available actions includes a first plurality of interaction options,
the first plurality of interaction options includes mute, email, and instant message,
the second menu of available actions includes a second plurality of interaction options,
the second plurality of interaction options includes call to join and remind via calendar,
the first menu includes at least one action not listed via the second menu, and
the first menu is displayed at a different time than the second menu.

24. The method of claim 19, wherein the meeting-in-progress graphical user interface includes a contact-participant user interface object next to the meeting participants organized into the accepted status, wherein an accepted status means that the participant has accepted a meeting invitation but has not joined the meeting, the contact-participant user interface object being effective to contact the meeting participants organized into the accepted status.

25. The method of claim 19, further comprising:
retrieving the roster of invited meeting participants and the acceptance status for each of the invited meeting participants through a request to an API of a calendaring service.

26. The method of claim 19, further comprising:
receiving one or more notifications from a calendaring service, the one or more notifications comprising one or more of the roster of invited meeting participants and the acceptance status for each of the invited meeting participants.

* * * * *